United States Patent [19]

Schreyer

[11] 4,363,509
[45] Dec. 14, 1982

[54] CHAIN GRAB HOOK PROVIDING FOR A FLAT LAY CROSS-OVER LINK

[75] Inventor: Kenneth D. Schreyer, Clarence, N.Y.

[73] Assignee: Columbus McKinnon Corporation, Tonawanda, N.Y.

[21] Appl. No.: 232,845

[22] Filed: Feb. 9, 1981

Related U.S. Application Data

[63] Continuation of Ser. No. 121,588, Feb. 14, 1980, abandoned, which is a continuation of Ser. No. 901,142, Apr. 28, 1978, abandoned.

[51] Int. Cl.³ .............................................. B66C 1/34
[52] U.S. Cl. .............................. 294/82 R; 24/230.5 R; 59/93
[58] Field of Search .................... 294/78 R, 82 R; 24/230.5 R; 59/93

[56] References Cited

U.S. PATENT DOCUMENTS

| 336,687 | 2/1886 | Barr | 24/230.5 R |
|---|---|---|---|
| 1,339,986 | 5/1920 | Schmidt | 24/230.5 R |
| 1,494,289 | 5/1924 | Round | 24/230.5 R |
| 1,758,744 | 5/1930 | Haubert | 24/230.5 R |
| 3,863,441 | 2/1975 | Kaufmann | 294/82 R X |
| 4,070,823 | 1/1978 | Schreyer et al. | 294/82 R X |
| 4,280,728 | 7/1981 | Fredriksson | 294/82 R X |

FOREIGN PATENT DOCUMENTS

| 77409 | 4/1954 | Denmark | 24/230.5 R |
| 316964 | 12/1919 | Fed. Rep. of Germany | 24/230.5 R |

Primary Examiner—Johnny D. Cherry
Attorney, Agent, or Firm—Bean, Kauffman & Bean

[57] ABSTRACT

A chain grab hook (10) which engages the cross-over link (30) in a generally flat lay or generally horizontal position is disclosed. The free-end portion (14) of the grab hook (10) includes a support surface (40) which supports the flat face of the cross-over link (30) over a substantial length of the link and over a substantial surface area. The tip (48) of the free-end portion (14) of the hook (10) projects inwardly to provide an obstruction which tends to prevent accidental chain slide-out. The support surface (40) may be slightly angled relative to the horizontal to cause the side links (32, 36) to rotate toward the neutral fiber center (26) of the hook (10) to reduce the moment arm applied by the loaded chain on the hook.

1 Claim, 3 Drawing Figures

U.S. Patent   Dec. 14, 1982   4,363,509
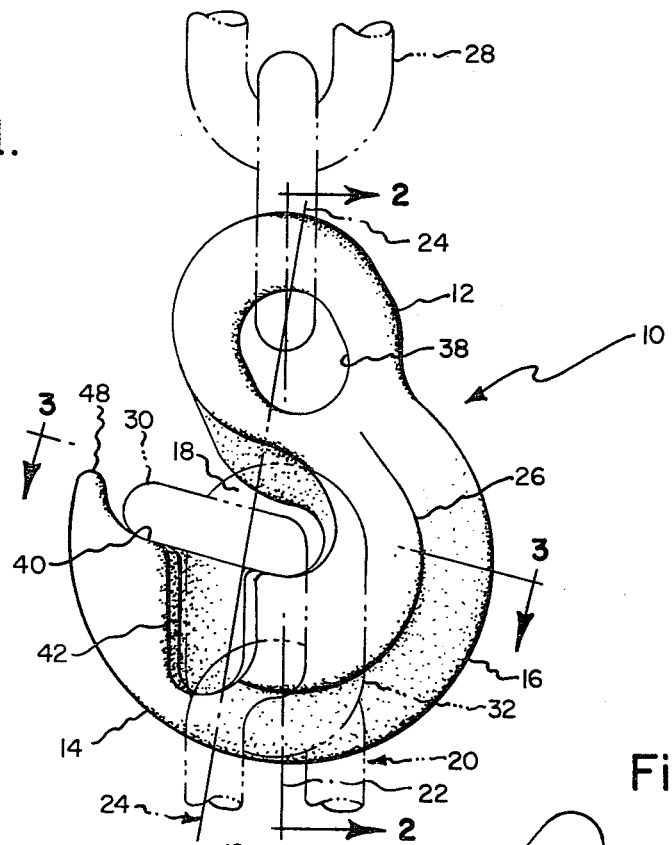
Fig. 1.
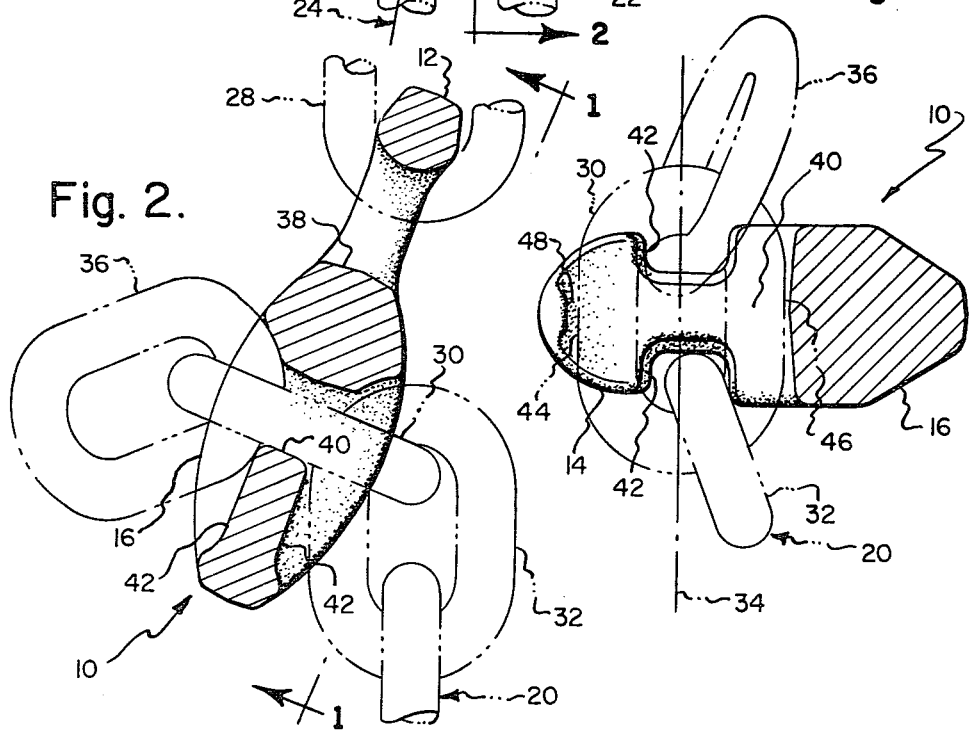
Fig. 2.
Fig. 3.

CHAIN GRAB HOOK PROVIDING FOR A FLAT LAY CROSS-OVER LINK

This application is a continuation, of application Ser. No. 121,588, filed Feb. 14, 1980, now abandoned, which is continuation of 901,142 of Apr. 28, 1978, now abandonded.

TECHNICAL FIELD OF THE INVENTION

The present invention relates to chain grab hooks. More Specifically, the invention relates to a specific chain grab hook which holds the engaged chain crossover link in a generally flat or horizontal position.

BACKGROUND OF THE INVENTION

Chain grab hooks grab a chain in such a way that the chain is prevented from running through the hook. To accomplish this end, the throat of the hook, defined by the shank portion at one side, the free-end portion at the other side, and an intermediate connecting bight portion, is made large enough to receive one link in an upright cross-over orientation but small enough to prevent passage therethrough of an adjacent link. The upright cross over link rests edgewise on the bridging bight portion at the lower end of the throat.

With presently constructed grab hooks, the chain, when placed under loaded conditions, is subjected to combined stresses, which, when large enough, ultimately cause the chain to fail. One of the stresses to which the chain is subjected is a tensile stress acting longitudinally of the chain. Chains are constructed to withstand such tensile stresses so that no problem is presented. When a chain link is seated in an upright or edgewise position in the throat of the grab hook to rest on the lower bight portion however, the cross-over link is also subjected to a shearing or cutting force. A chain link is not ordinarily designed to withstand such a shearing force acting transversely of the link. Accordingly, when a chain is used in conjunction with a grab hook, the breaking strength of the upright link within the throat of the hook is reduced so that, when overloaded, the chain invariably breaks at this point. It is therefore often necessary to use largr chains than are required to lift a desired load in order to assure an acceptable margin of safety. This, in turn, causes increased expense and inconvenience to the users of the chain.

In addition to possible chain failure, the hook is also subject to failure under either overload conditions or conditions of cyclic fatigue. Both the overload failure value and the fatigue life of a part are detrimentally effected by high stress concentrations as opposed to a more uniform overall stress distribution. A chain grab hook having a vertically oriented slot for receiving the cross-over link produces very high localized stress concentrations in the hook since the cross-over link is vertically supported by the hook in a very limited area of the saddle or bight portion of the hook. In many hook designs, the cross-over link, under the influence of the load, pivots at one side of the hook to lift off of the support saddle along most of its length with the result of being supported by an even smaller area of the hook. In order to prevent early hook failure, conventional hooks have of necessity been fabricated with excessive quantities of material and/or have been given a relatively low maximum load limit.

Accidental disengagement of the chain from conventional chain grab hook also presents a hazzard. In an unloaded or slack condition, it is possible for the crossover link of the engaged chain to slide out of the engaging hook in a manner which either completely disengages the chain from the hook or removes the crossover link to a position which would cause either chain or hook damage if the loaded condition were to be resumed.

THE INVENTION

The present invention relates to an improved chain grab hook wherein improved stress distribution characteristics in both the hook itself and the engaged chain are achieved; wherein improved safety by the prevention of accidental chain fallout is achieved; and wherein a reduction in hook reach is achieved thereby minimizing the quantity of material needed for fabrication of the hook.

The chain grab hook of the present invention is basically characterized by the fact that the shank, free-end, and bight portion of the hook are configured to grab the chain in a manner which supports the cross-over link of the engaged chain in a flat attitude forming an angle with the horizontal no greater than 45°. This "flat lay" is particularly advantageous in that both legs or barreis of the chain link are supported by and rest on an upwardly facing supporting surface of the free-end of the generally C-shaped hook. Such support avoids stress concentrations and the bending forces experienced by both the hook and the cross-over chain link. The extended support surface provided for this "flat lay" link has a dimension substantially equal to the length of the cross-over link. Recesses in the side of the free-end portion of the hook are provided to receive therein a portion of each of the side downstanding links joined to the cross-over link of the engaged chain.

The tip of the free-end portion is upwardly turned toward the shank portion of the hook in order to provide an obstruction to accidental removal of the crossover link. This upwardly turned tip cooperates with the engagement of the downstanding side links in the side recesses to virtually eliminate accidental disengagement of the chain from the hook.

The support surface of the free-end portion may be inclined to the horizontal by an angle of up to 45°. Accordingly, the cross-over link of the engaged chain is also tilted from the horizontal so that its joined side links have a tendency to rotate back toward the body of the hook. This tendency to rotate or slide toward the body of the hook minimizes the distance between the load axis of the loaded chain and the neutral fibre axis of the hook to thereby minimize the bending moment placed on the hook.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 1 is an elevational side view of the preferred embodiment of the present invention showing the hook in its loaded condition;

FIG. 2 is a vertical cross-section of the loaded hook of FIG. 1 taken along the view lines 2—2; and FIG. 3 is a cross-section of the hook of FIG. 1 taken along view lines 3—3.

DESCRIPTION OF THE BEST MODE OF THE INVENTION

While the invention is susceptible of various modifications and alternative constructions, there is shown in the drawings and there will hereinafter be described, in detail, a description of the preferred embodiment of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalents.

The preferred embodiment of the chain grab hook 10 of the present invention, as illustrated in the figures, consists of a shank 12, a free-end 14 and a connecting bight 16, all of which lie in the same plane and which together generally form a C-shape. Shank 12, free-end 14 and bight 16 define therebetween a slot or throat 18 adapted to receive therein a traversing or cross-over link 30 of an engaged load carrying chain 20 of the bent wire link type. Shank portion 12 is provided with a hook eye 38 for connecting the hook to a chain 28.

Free-end portion 14 includes a generally upwardly facing surface 40 which is the primary bearing surface for supporting the cross-over link 30 in a generally flat attitude.

The figures show that support surface 40 lies generally in a plane which is tilted from the horizontal by a given angle in the plane of the hook when the hook is loaded. Inclining support surface 40 and therefore link 30 to the horizontal, as shown in FIG. 1, causes the downstanding lateral links 32 and 36 joined to the cross-over link 30 of the engaged load chain 20 to swing in the downhill direction. This tendency to swing or rotate toward the bight 16 and away from the central longitudinal axis 34 of link 30 (see FIG. 3) as well as away from the hook axis 24 causes the load line 22 of the chain 20 to be moved closer to the neutral "fiber" 26 of the hook whereby the bending moment placed on the hook by the tensioned chain 26 is reduced.

When the hook 10 of the invention is loaded with a load bearing chain 20 as shown in FIG. 1, the slot or throat 18 lies with a generally horizontal attitude so that free-end portion 14 of the hook and its upwardly facing surface 40 define the bottom of the throat 18. With this attitude, link 30 is supported, as shown, in a generally horizontal attitude so that surface 40 provides vertical support to both of the opposite legs or barrel sections 44, 46 of link 30 (see FIG. 3). In order to provide the greatest degree of support so that stress concentrations are minimized, surface 40 is formed to have a width across the plane of the hook substantially equal to the length of one of the barrel sections of the link cross-over link 30, which is virtually the entire length of the link itself. While it is preferred to support both barrels 44, 46 along substantially their entire lengths, it should be understood that the scope of the invention is broad enough to include supporting link 30 substantially along the entire length of only one barrel while supporting the other barrel over a significantly reduced surface. It is also conceivable, although less desirable, to provide a flat lay without supporting either barrel along its entire length.

As will be recognized, as the angle of incline to the horizontal is increased, more of the load of chain 20 is shifted to the "inside" barrel 46 of link 30. One of the major advantages of distributing the load over increased areas of both link 30 and hook surface 40 of the invention will be lost, therefore, if the angle of incline to the horizontal is too large. An angle of incline no more than 45° from the horizontal provides a generally "flat" attitude for cross-over link 30 while still deriving the support benefits inherent in the "flat" lay. On the other hand, angles of incline greater than 45° place the cross-over link in a generally "upstanding" attitude rather than in the desirable "flat" attitude of the invention and such a hook-chain system would thus lack the added support advantages of the present invention.

Looking specifically at FIG. 1, a preferred hook design in which surface 40 is slightly angled to the horizontal before loading the hook is shown. After the hook has been engaged by a chain 20 and loaded, as shown, the hook has rotated under the influence of the load in the clockwise direction to shift load line 22 of the chain toward bight 16 as a result of the previously described swinging of side link 32. The hook 10 is shown in its loaded, static condition in which the angle between surface 40 and the horizontal is approximately 15°. While the angle has been selected as that which is preferred, it should be recognized that other angles may be selected and may result depending on engineering design and on the balance of the hook. Nevertheless, the present invention is intended to include hook designs which result in as much as a 45° incline of support surface 40 to the horizontal when the hook has been loaded. It is felt that angles greater than 45° diminish the ability of support surface 40 to support both opposite barrel sections of cross-over link 30 to a degree that renders such greater angles undesirable.

As has been described, it is desirable to form free-end 14 and support surface 40 so that the support surface has a dimension perpendicular to the plane of the hook which, in at least one location, is at least as long as one of the barrel sections 44 or 46 of the cross-over link 30. One way of accomplishing this desirable end without interfering with the attitude of the side downstanding links 32 and 36, is to form hook 10 with a relatively hefty free-end portion 14 and to provide longitudinally extending depressions 42 in the sides of the free-end 14 for receiving therein one barrel section of the side links 32, 36. Longitudinally extending depression 42 may be formed generally parallel to the vertical so as not to interfere with the tendency of links 32 and 36 to freely assume an orientation in line with the force of gravity or the depression may be formed to extend generally parallel to the unloaded axis 24 or oriented to extent at an intermediate angle.

Grooves 42 therefore permit each barrel section of link 30 to be supported in a vertical direction substantially over their entire lengths without undue interference between the side link 32 or 36 and the body of the hook. Since link 30 is vertically supported along virtually its entire length, and side link 32 is permitted to penetrate into groove 42, there is very little if any tendency for link 30 to rock up away from the support surface 40 as is the tendency in many prior known chain hooks. Accordingly, chain link 30 is supported by upwardly facing surface 40 substantially along the entire length of both barrel sections 44, 46 of the cross-over link 30, thereby distributing the load throughout the length of the link and over a significant contact area of the hook 10. Both chain 20 and hook 10 are therefore less likely to fail under heavy loads and under accumulated cyclic stresses.

As best seen in FIG. 1, free-end portion 14 may include an upwardly turned tip 48 which cooperates with the configuration of shank 12 in order to form a two-part throat 18 having a mouth part and a cross-over link engaging part. The mouth part as shown in angled relative to the cross-over link engaging part so that removal of the cross-over link 30 from throat 18 requires the cross-over link 30 to be twisted as it is removed from the throat. Tip 48 then acts as an obstruction to the removal of the cross-over link from the chain grab hook 10 and lessens the probability of unintentional disengagement of the chain 20 from the hook 10.

Grooves 42 formed in free-end portion 14 also act to lessen the change of accidental removal of the chain from the hook. Side links 32 and 36 seat themselves within grooves 42 so that grooves 42 limit their outward movement with the result that they may not be accidentally slid in the chain disengaging direction. Disengagement of chain 20 from the chain grab hook 10 is easily manually accomplished, however, by concurrently lifting lateral links 36 and 32 to align their axes generally with the axis of cross-over link 30, sliding cross-over link 30 outwardly along the slot 10 while simultaneously rotating link 30 to avoid the projecting tip 48. This complicated disengagement motion is one which can easily be accomplished by a workman whose intention is to remove the chain from the hook. However, the disengagement motion is so complicated that the probability of its accidental occurence is very slight even if the chain hook 10 where to be tumbed end-over-end or held upside down. Chain hook 10 of the present invention therefore is significantly safer than prior known chain grab hooks.

What is claimed is:

1. A chain grab hook for suspending a load, which comprises:

a hook body including a shank having an eye by means of which the hook is suspended in vertical attitude, a bight integrally joined with said shank and a free end portion integrally joined with said bight; said shank, bight and free end portion lying in a common plane generally forming a C-shape to define a throat;

said free end portion having a substantially flat upwardly facing support surface defining the lower side of said throat and said free end portion having generally vertically extending depression in its opposite sides whereby said support surface in plan view presents a widthwise elongate support surface portion at the innermost end of said throat and a narrowed portion of reduced width, said elongate surface portion supporting the barrel portion of a chain link received in said throat and the width of said narrowed portion being such as to receive bight portions of adjacent chain links;

said shank overlying said support surface to define the upper side of said throat and having downwardly and laterally outwardly facing abutment surfaces on opposite sides thereof to engage the bight of one of said adjacent links to thereby force such bight also against an edge of said narrowed portion when the other of said adjacent links has a load suspended therefrom; and said depressions being laterally offset from said eye whereby the hook is both rotated in its vertical plane and tilted to one side relative thereto when the chain supports a load.

* * * * *